United States Patent
Ron et al.

(10) Patent No.: US 6,775,359 B1
(45) Date of Patent: Aug. 10, 2004

(54) VOICE REPLY TO INCOMING E-MAIL MESSAGES, VIA E-MAIL

(75) Inventors: Tamir A. Ron, Tel Mond (IL); Yaacov Weingarten, Karnei Shomron (IL)

(73) Assignee: Comverse Ltd., Tel Aviv (IL)

( * ) Notice: Subject to any disclaimer, the term of this patent is extended or adjusted under 35 U.S.C. 154(b) by 0 days.

(21) Appl. No.: 09/474,046

(22) Filed: Dec. 28, 1999

(51) Int. Cl.[7] ............................................. H04M 1/64
(52) U.S. Cl. ............................... 379/88.14; 379/88.13; 379/88.17; 379/210.01; 455/412.2; 455/413; 455/414.4
(58) Field of Search .................... 379/88.13–88.15, 379/88.17, 88.22, 88.23, 93.01, 93.17, 210.01; 455/412, 413, 445, 466, 566, 412.1, 412.2, 414.1, 414.2, 414.4; 709/203, 204, 206, 227, 217, 235, 245, 246

(56) References Cited

U.S. PATENT DOCUMENTS

| | | | |
|---|---|---|---|
| 5,333,266 A | * 7/1994 | Boaz et al. | 709/206 |
| 5,557,659 A | 9/1996 | Hyde-Thomson | |
| 5,717,742 A | * 2/1998 | Hyde-Thomson | 379/88.17 |
| 6,169,911 B1 | * 1/2001 | Wagner et al. | 455/566 |
| 6,246,983 B1 | * 6/2001 | Zou et al. | 704/260 |
| 6,463,134 B1 | * 10/2002 | Okada et al. | 379/93.24 |
| 6,549,612 B2 | * 4/2003 | Gifford et al. | 379/67.1 |

FOREIGN PATENT DOCUMENTS

| | | | | |
|---|---|---|---|---|
| WO | WO 99 65256 A | 12/1999 | | H04Q/7/00 |
| WO | WO 00 59196 A | 10/2000 | | H04Q/3/533 |

OTHER PUBLICATIONS

"Phone.com UP.Mail", Aug. 1999, Phone.Com XP002165543.
T9 Text Input Technology by Tegic Communications, http://www.tegic.com.
Tornado Development Voice Reply System, http://tornadodevelopment.com.

* cited by examiner

*Primary Examiner*—Roland G. Foster
(74) *Attorney, Agent, or Firm*—Sughrue Mion, PLLC

(57) ABSTRACT

Method and apparatus for replying to an incoming E-mail message by a corresponding voice message response. The recipient reads, or listens to the incoming E-mail message and voice data, containing a recorded voice reply to the incoming E-mail message is then generated. An E-mail reply message which comprises the voice data is generated and sent to the originator of the incoming E-mail message, as an E-mail reply message. The incoming E-mail message may be attached to the generated voice data before sending it sent to the originator.

37 Claims, 3 Drawing Sheets

VOICE REPLY TO INCOMING E-MAIL MESSAGES, VIA E-MAIL

FIELD OF THE INVENTION

The present invention relates to the field of voice messaging over electronic-mail (E-mail) systems. More particularly, the invention relates to a method and apparatus for replying to an incoming E-mail message with a corresponding voice message, which is delivered back to the originator of the incoming message, as an E-mail message.

BACKGROUND OF THE INVENTION

E-mail systems are widely used for communicating between subscribers of a data communication network (such as the Internet), by the exchange of messages via the network. When a subscriber (hereinafter referred to as "the sender") wishes to contact another subscriber (hereinafter referred to as "the recipient"), he normally sends a message to the recipient, expecting or without expecting a reply. For example, if the message sent is a question, the sender expects a reply. On the other hand, if the message sent is a notification, the sender at most receives an indication that the message has been successfully received. Normally, messages are exchanged between subscribers through their workstations, and in most cases these messages are textual or pictorial messages, which can be displayed on the display screen of the station of each subscriber. In addition, modern E-mail systems enable the subscriber to attach a data file to his textual message, which can be opened and read by the recipient. Many types of data files can be attached, including audio (e.g., .wav) or video (e.g., .mov) files, that can be played by the recipient, provided his workstation is equipped with the necessary hardware and software.

Advanced telecommunication and wireless technologies also enable subscribers to access their E-mail "inbox", and to read their messages by using a telephone-based interface, rather than a workstation. Such telephone-based interfaces may comprise smart-phones (i.e., a telephone with text and/or Internet capabilities) or cellular phones (which normally have a Liquid Crystal Display (LCD)), or regular phones. The recipient has several options to access the content of a selected message. If a smart-phone or a cellular-phone is used, the message can be displayed on the telephone display of the recipient as a textual message. If a regular phone is used, on the other hand, the incoming message can be converted into a voice message (e.g., by activating a "text-to-speech" converter), which is then heard by the recipient.

In some cases, after reading the incoming E-mail message the recipient wishes to reply to the sender not via e-mail using a computer, but rather from a telephone. The recipient has several reply options: The first option is simply to initiate a phone-call to the sender, and talk with him. However, by talking with the sender the recipient "forces" the sender to handle the call at a time which may be inconvenient to him. The second option, which is mostly available in cellular phones, is to send a response message to the sender using Short Message Service (SMS), which is a protocol that allows displaying short messages (typically, up to 160 characters) on the LCD of a cellular phone (or a smart phone), which supports SMS.

When the recipient wishes to type a text reply and to send it from his cellular phone, he uses the phone keypad as an input device, to type the required characters. However, this typing feature is cumbersome, since each key in the keypad usually represents three letters, and the recipient has to "select" each desired letter by "clicking" on each key a predetermined number of times, which corresponds to the location of the desired letter among the other letters on this key. In addition, typing errors might occur during multiple clicking.

T9™ Text Input (Tegic Communications, Seattle, USA) offers a relatively quick text input technology for cellular phones. This technology provides the user with an intuitive interface, which requires only one click on a key to type a letter. The text input employs software, which scans a linguistic database to determine a correct word resulting from consequent clicking. However, typing characters by using the keypad still remains awkward to the user. Therefore, a reply method which eliminates the need to compose a textual response message to an incoming E-mail message, by typing characters is greatly needed.

U.S. Pat. Nos. 5,557,659 and 5,717,742 disclose E-mail systems with integrated voice messages, which comprises a message handling systems for sending and retrieving both voice and text messages over a computer network. The voice message, which can be input through a phone, is converted into a digital voice file, which is stored in a memory area that corresponds to the mailbox of the intended recipient. However, this system does not provide the capability of replying by this voice message to an incoming E-mail message.

Tornado Development Inc. (Manhattan Beach, Calif., USA) offers subscribers a voice reply system to e-mail messages by calling a phone number and recording a reply message. However, this system requires a text-to-speech converter for allowing a subscriber to listen to an incoming message using his telephone, and cannot display textual messages on the subscriber's telephone display.

All the methods described above have not provided a satisfactory solution to the problem of replying to an incoming E-mail message with a corresponding voice message response, which overcome the drawbacks of the prior art.

It is an object of the present invention to provide a method and apparatus for replying to an incoming E-mail message with a corresponding voice message response, which is delivered back to the sender via E-mail.

It is another object of the present invention to provide a method and apparatus for replying to an incoming E-mail message with a corresponding voice message response without typing.

It is a further object of the present invention to provide a method and apparatus for replying to an incoming E-mail message with a corresponding voice message response, which is recorded through the recipient's telephone.

Other objects and advantages of the invention will become apparent as the description proceeds.

SUMMARY OF THE INVENTION

The present invention is directed to a method for replying to an incoming E-mail message with a corresponding voice message response. After the recipient reads, or listens to, the incoming E-mail message, voice data containing a recorded voice reply to the incoming E-mail message is generated. An E-mail reply message, which comprises the voice data, is generated and sent to the sender of the incoming E-mail message, as an E-mail reply message. Preferably, the incoming E-mail message is attached to the generated voice data before sending it as a reply message. According to a preferred embodiment of the invention the recipient reads incoming E-mail messages from the display of his telephone. According to another preferred embodiment of the invention the recipient listens to the contents of incoming E-mail messages using his telephone.

Preferably, the recipient accesses his mailbox, and thereafter a list of incoming E-mail messages destined to him is presented, from which he selects a single incoming message. The content of the selected incoming message is presented to the recipient, and in response, a voice reply message originated by the recipient is recorded. A voice reply data-file containing the voice reply message is generated, and then used to compose a reply E-mail message. The composed reply E-mail message is then sent to the sender of the incoming E-mail message. Delivery of the incoming message to the recipient may be carried out by displaying text and/or image(s) on the telephone display of the recipient or by converting the content of the selected incoming E-mail message to voice data and playing that voice data to the recipient via his telephone.

Preferably, during the reply procedure a voice reply data-file is generated and the incoming E-mail message is saved in a memory. A portion of the data contained in the incoming E-mail message, or the whole message, is extracted from the memory and a reply E-mail message is then composed from the combination of the voice reply data-file and the extracted portion.

The invention also encompasses a system for replying to an incoming E-mail message with a corresponding voice message response. The system comprises a display or audio apparatus for reading the incoming E-mail message, apparatus for generating voice data containing a recorded voice reply to the incoming E-mail message, and apparatus for sending the generated voice data to the sender of the incoming E-mail message as an E-mail reply message. The system may further comprise apparatus for attaching the incoming E-mail message to the generated voice data, prior to sending it. The system comprises apparatus for allowing the recipient to read incoming E-mail messages from the display of his telephone or to listen to incoming E-mail messages using his telephone. Such apparatus is conventional in the art, and is therefore not described herein in detail, for the sake of brevity.

BRIEF DESCRIPTION OF THE DRAWINGS

The above and other characteristics and advantages of the invention will be better understood through the following illustrative and non-limitative detailed description of preferred embodiments thereof, with reference to the appended drawings, wherein.

DETAILED DESCRIPTION OF THE PREFERRED EMBODIMENTS

Figure 1:
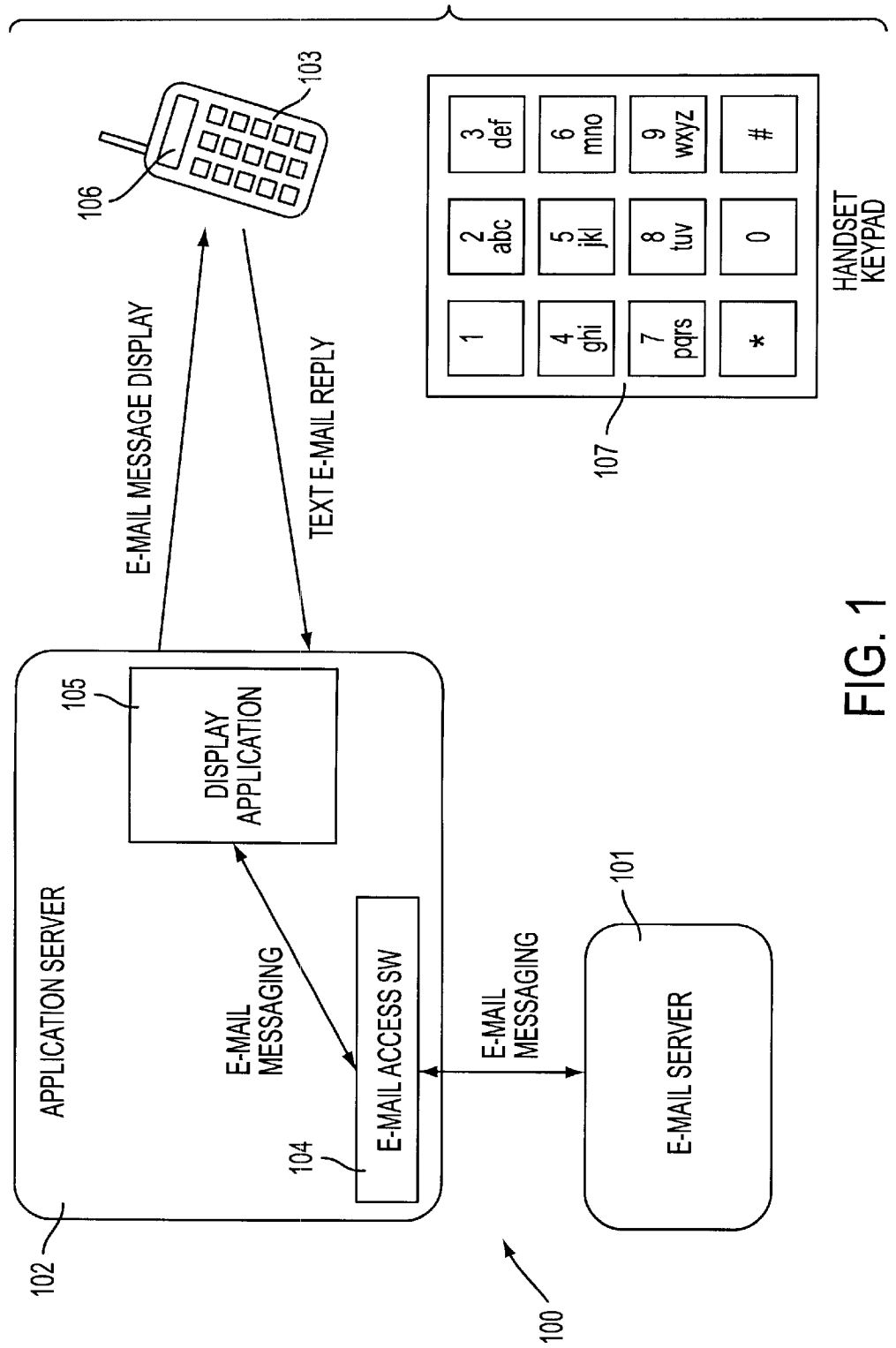
FIG. 1 schematically illustrates a conventional system for replying to an incoming E-mail message, read by a subscriber via a cellular phone.

FIG. 1 schematically illustrates a conventional system for replying to an incoming E-mail message, which is read by a subscriber (the recipient) via a cellular telephone. The system 100 comprises an E-mail server 101, an application server 102 and a cellular phone 103. The E-mail server 101 manages the exchange of messages between different subscribers, and stores the personal mail addresses of the subscribers. Each sent message is input into the mailbox (which may be a specific directory) of the subscriber to whom the message is addressed, and is saved therein. Whenever desired, each subscriber can access his mailbox in E-mail server 101 and retreive one or more messages (if there are any). The E-mail server 101 is connected via a data link to an application server 102, which functions as an interface between the subscriber's cellular phone 103 and E-mail server 101. The application server 102 employs E-mail access software 104, which operates in combination with suitable display application 105. The E-mail access software 104 manages the storage and extraction of incoming and outgoing messages to and from the mailboxes of each subscriber. The display application 105 translates each incoming E-mail message (extracted from the mailbox of a specific subscriber in E-mail server 101) to data, which is then carried by the Radio-Frequency (RF) signal which is transmitted to the cellular phone 103 of the subscriber. The transmitted E-mail message is received by the cellular phone 103 of the recipient, and is displayed as a textual message on its display 106.

When the recipient wishes to reply to the sender of the displayed textual message, he types a response message to the sender by depressing (clicking on) the proper keys on the cellular phone keypad 107. The composed text of the reply message appears on the display 106, so as to enable the user to complete and/or to change the text before sending the reply message. The composed reply message is carried (e.g., by modulation) by the RF signal which is transmitted from cellular phone 103, back to the application server 102. The display application extracts the data that corresponds to the reply message, and converts it to a textual message that is sent as an E-mail message to E-mail server 101. The E-mail access software 104 directs the response message to the mailbox (inbox) of the sender, from which he can read it.

Figure 2:
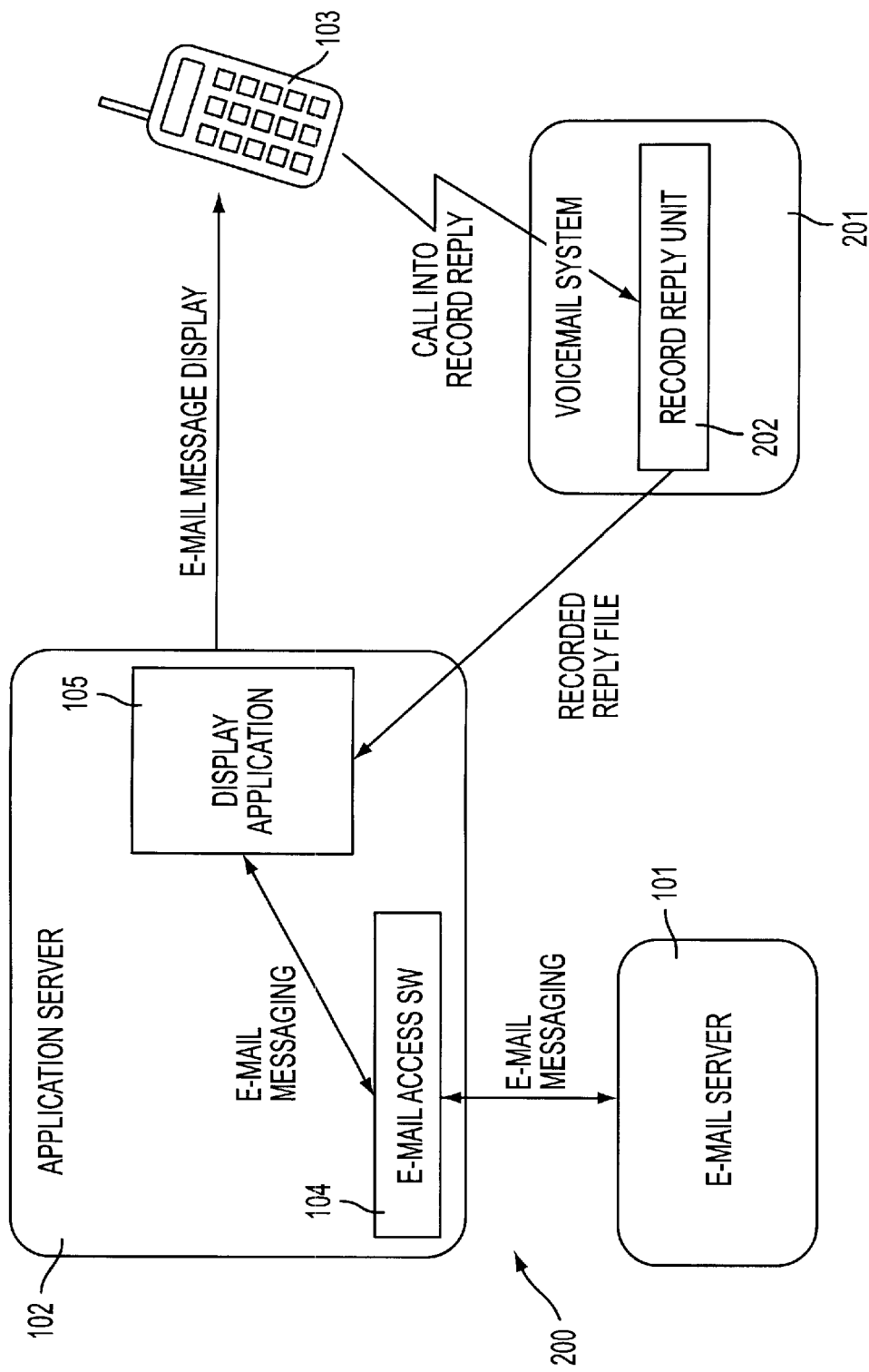
FIG. 2 schematically illustrates a system for replying to an incoming E-mail message with a recorded voice message, according to a preferred embodiment of the invention.

FIG. 2 schematically illustrates a system for replying to incoming E-mail message, with a recorded voice message, according to a preferred embodiment of the invention. The system 200 comprises an E-mail server 101, an application server 102, a voice-mail system 201 and at least one telephone, such as a cellular phone 103. The operation of the E-mail server 101 and of the application server 102 are essentially similar to their operation as described above with respect to the conventional system 100 (FIG. 1). The cellular phone 103 continues to receive incoming messages essentially the in the same way as in the conventional system 100.

According to a preferred embodiment of the invention, when the recipient wishes to reply to the sender of the displayed textual message, he accesses the voice-mail system 201, which comprises a record reply unit 202 linked to the application server 102. The recipient wishing to reply to an incoming E-mail message initiates a call from his cellular phone 103 to the record reply unit 202. He then records a voice reply message for the sender, and the record reply unit 202 converts the recorded voice (reply) message to a reply file, which is sent from the voice-mail system 201 to the application server 102. The reply file is sent as an E-mail message, or an attachment thereto, to the E-mail server and stored in the mailbox of the sender as an incoming E-mail message. Whether the reply file is sent in the E-mail message or attached thereto the E-mail message is referred as comprising voice data of the voice reply. Whenever desired, the sender can access his inbox, select the recorded response message and listen to it by activating suitable software which processes the recorded reply file. Suitable players for processing an audio file are well known in the art and may be, for instance, a Media Player, which is supplied with Microsoft Windows, or any other suitable media player. Likewise, the audio file embodying the reply message can be of any suitable type, e.g., a WAV file.

Alternatively, when the sender selects the response message from his mailbox, the recorded reply file can be processed and converted to a textual message (e.g., by using speech-to-text conversion software), which is read by the sender. Suitable software capable of converting voice to text is well known in the art, and several software packages are available off the shelf. An illustrative example of such a suitable software package is the IBM Simply Speaking™ software.

Therefore, the recipient can reply to the sender without the need to type a textual message. In addition the recorded reply file can be attached to the incoming message and sent back to the sender in a single E-mail message containing an attachment. This enables the sender to easily associate the recorded reply message with the (incoming) message he has originated. Of course, all the operations hereinbefore described can be carried out using a smart phone or a conventional telephone, rather than a cellular phone.

Figure 3:
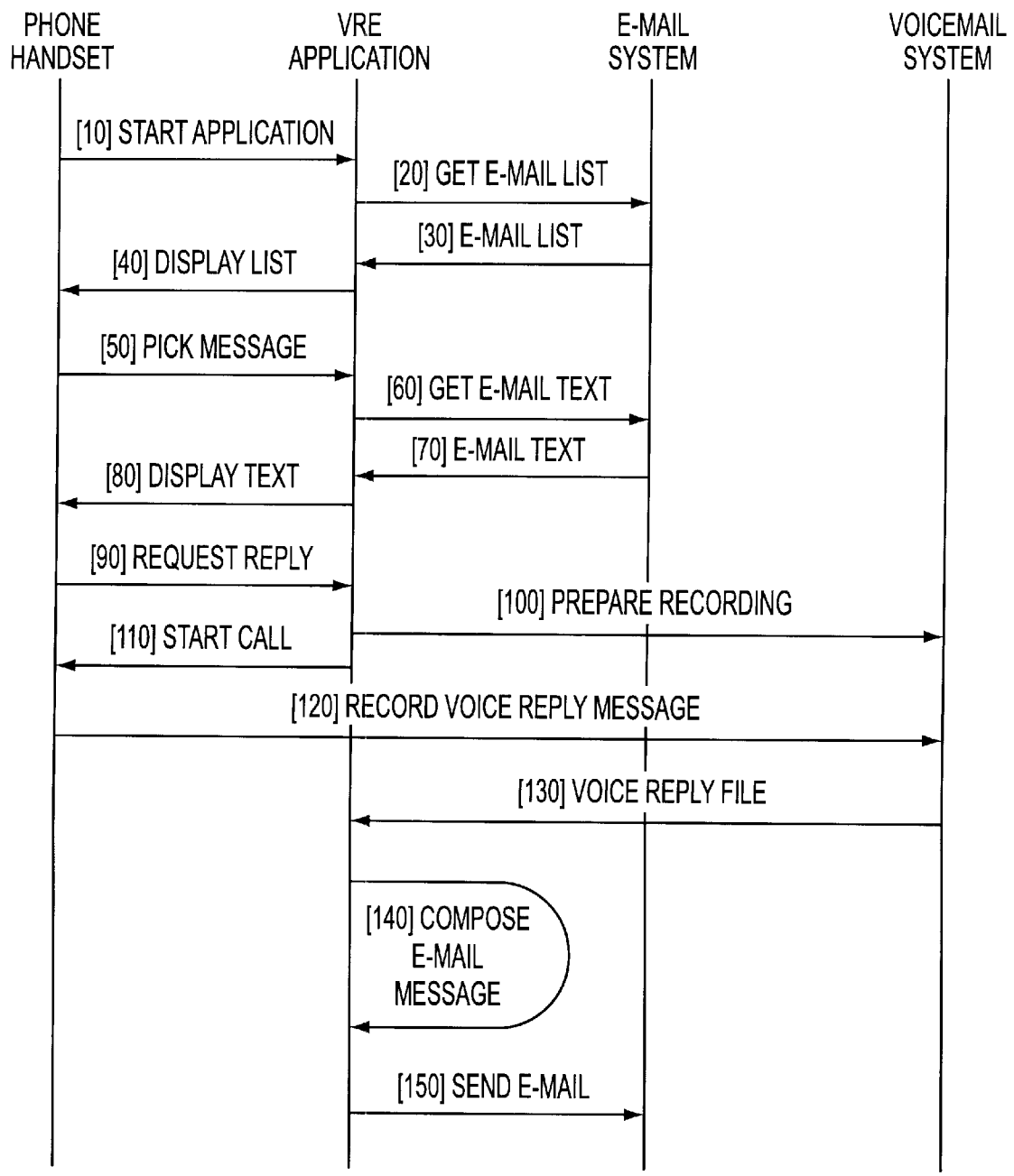
FIG. 3 schematically illustrates the operations of a system for replying to an incoming E-mail message, with a recorded voice message, according to another preferred embodiment of the invention.

FIG. 3 schematically illustrates the operation of a system for replying to an incoming E-mail message with a recorded voice message, according to a preferred embodiment of the invention. At 10, the subscriber initiates a connection with his Unified Message (UM) system through his smart-phone or his cellular phone, which have an interactive display. The UM system combines different messaging systems (e.g., E-mail and voice-mail), and allows subscribers to receive all their messages in a single session using a uniform, intuitive interface for all types of messages. The connection is established after operating a "Voice Reply to E-mail" (VRE) application, which is linked to an E-mail system and to a voice-mail system. At 20, the VRE application accesses the mailbox of the subscriber at the E-mail system with a request for a list of incoming E-mail messages. At 30, the E-mail system outputs the required list and delivers it to the VRE application. At 40, the VRE application displays the list of incoming E-mail messages on the display of the telephone of the subscriber. At 50, the subscriber selects a message from the list, and inputs his selection to the VRE application. At 60, a request for the text of the selected message is delivered from the VRE application to the E-mail system. In response, at 70 the text of the selected message is provided to the VRE application. At 80, the text is displayed on the display of the telephone of the subscriber and is read. Alternatively, the selected message can be heard using a suitable feature, such as "E-mail-to-Speech". If the subscriber wishes to reply, at 90, he submits a request for replying to the read (selected) message to the VRE application by clicking on predetermined keys of the telephone keypad (e.g., composing and sending an SMS message indicating that he wishes to record a voice reply). At 100 the VRE application interacts with the voice-mail system and initiates a request for message recording. At 110, a phone-call connection is established between the subscriber and the voice-mail system, so as to enable recording. At 120, the voice-mail system prompts the subscriber to start recording his message, and the subscriber records the content of his response message by talking into the microphone of his handset. At the end of recording (indicated by the subscriber by an input from handset of his phone, e.g., by typing a # or any other predetermined symbol) the recorded message is saved in a temporary (and persistent) memory. The recorded message can be deleted from memory after verifying that the reply message has been sent. Concurrently, the data portion of the selected message, which is required to format the reply message (e.g., the subject and/or other selected details) is also saved in memory. At 130, a voice reply file, containing the recorded message is generated in the voice-mail system and sent to the VRE application. At 140, the VRE composes a single reply E-mail message by combining the voice reply file with the stored data portion of the selected message. The reply E-mail message may be an attachment file to the selected message. At 150, the reply message is sent as an E-mail message to the originator (the sender) of the selected message. The system may expect for a phone-call from the recipient, identify the recipient at the moment when he calls and record a corresponding voice-reply message. Alternatively, in response to the SMS message (indicating that he wishes to record a voice reply), the system can initiate a phone-call to the recipient and thereafter record a corresponding voice-reply message.

Of course, the reply message can be generated and sent from a conventional telephone using E-mail-to-speech technology, or from any telephone having a Telephone User Interface (TUI).

If the recipient wishes to reply to an incoming message later (i.e., not in the current session, during which the incoming message is received), he establishes a telephonic connection at a suitable timing, and the system provides the recipient a parameter associated with a specific incoming e-mail message (to which he wishes to reply). Such parameter may be for example, a list of incoming messages and/or their corresponding index that can be displayed on his telephone display. The recipient can select index of the specific incoming message and then record a reply message to that selected message.

The above examples and description have of course been provided only for the purpose of illustration, and are not intended to limit the invention in any way. As will be appreciated by the skilled person, the invention can be carried out in a great variety of ways, employing more than one technique from those described above, such as using a wireline telephone rather than a cellular-phone, all without exceeding the scope of the invention.

What is claimed is:

1. A method for replying to an incoming E-mail message by a corresponding voice message response, comprising:
    a) receiving the entire contents of said incoming E-mail message at a telephone of a recipient;
    b) using the recipient's telephone to indicate a desire to respond to said incoming E-mail message;
    c) initiating a call to the recipient's telephone to begin a recorded voice reply;
    d) generating voice data containing the recorded voice reply to said incoming E-mail message;
    e) generating an E-mail reply message comprising said voice data; and
    f) sending said E-mail reply message to the originator of said incoming E-mail message, as an E-mail reply message.

2. A method according to claim 1, further comprising attaching the incoming E-mail message to the generated voice data prior to sending said generated voice data.

3. A method according to claim 1, wherein the incoming E-mail message is displayed to the recipient on the display of the recipient's telephone.

4. A method according to claim 1, wherein the incoming E-mail message is played to the recipient using the recipient's telephone audio system.

5. A method according to claim 3, wherein the telephone is a cellular telephone.

6. A method according to claim 3, wherein the telephone is a smart-phone.

7. A method according to claim 1, comprising:
   a) accessing the mailbox of the recipient of the incoming E-mail message;
   b) presenting a list of incoming E-mail messages, intended for said recipient;
   c) selecting an incoming E-mail message from said list;
   d) presenting the content of the selected incoming E-mail message to said recipient;
   e) recording a voice reply message originated by said recipient;
   f) generating a voice reply data-file containing said voice reply message;
   g) composing a reply E-mail message from said voice reply data-file; and
   h) sending said composed reply E-mail message to the originator of said incoming E-mail message.

8. A method according to claim 7, wherein presentation to the recipient is carried out by displaying text and image(s) on the telephone display of said recipient.

9. A method according to claim 7, wherein presentation to the recipient is carried out by playing voice data representing the contents of the selected incoming E-mail message, to said recipient via his telephone.

10. A method according to claim 7, further comprising:
    a) generating a voice reply data-file and/or saving the incoming E-mail message in a memory;
    b) extracting at least a portion of the data contained in said incoming E-mail message from said memory; and
    c) composing a reply E-mail message from a combination of the voice reply data-file and said portion.

11. A system for replying to an incoming E-mail message with a corresponding voice message reply, comprising:
    a) presentation apparatus for presenting the entire contents of said incoming E-mail message as text at a telephone of a recipient;
    b) means for indicating a desire to respond to said incoming E-mail message;
    c) means for initiating a call to the recipient's telephone to begin a recorded voice reply;
    d) means for generating voice data containing the recorded voice reply to said incoming E-mail message; and
    e) means for sending said generated voice data to the originator of said incoming E-mail message, as an E-mail reply message.

12. A system according to claim 11, further comprising means for attaching the incoming E-mail message to the generated voice data prior to sending said generated voice data.

13. A system according to claim 11, wherein the presentation apparatus comprises a display provided in, or coupled to, a telephone.

14. A system according to claim 11, wherein the presentation apparatus comprises an audio system provided in, or coupled to, a telephone.

15. A system according to claim 13, in which the telephone is a cellular telephone.

16. A system according to claim 13, in which the telephone is a smart-phone.

17. A system according to claim 11, comprising:
    a) means for accessing the mailbox of the recipient of the incoming E-mail message;
    b) means for presenting a list of incoming E-mail messages, destined to said recipient;
    c) means for selecting an incoming E-mail message from said list;
    d) means for presenting the contents of the selected incoming E-mail message to said recipient;
    e) means for recording a voice reply message originated by said recipient;
    f) means for generating a voice reply data-file containing said voice reply message;
    g) means for composing a reply E-mail message from said voice reply data-file; and
    h) means for sending said composed reply E-mail message to the originator of said incoming E-mail message.

18. A system according to claim 17, comprising display apparatus for displaying text and/or image(s) on the telephone display of the recipient.

19. A system according to claim 17, comprising audio apparatus for playing voice data representing the contents of the selected incoming E-mail message, to the recipient via his telephone.

20. A system according to claim 17, further comprising:
    a) a memory for saving the incoming E-mail message and/or the generated voice reply data-file;
    b) means for extracting at least a portion of the data contained in said incoming E-mail message from said memory; and
    c) means for composing a reply E-mail message from the combination of the voice reply data-file and said portion.

21. A method for replying through a telephone device to an incoming E-mail message by a corresponding voice message response, comprising:
    a) receiving the entire contents of said incoming E-mail message as a text message at a telephone of a recipient;
    b) using the recipient's telephone to indicate a desire to respond to said incoming E-mail message;
    c) initiating a call to the recipient's telephone to begin a recorded voice reply;
    d) generating voice data containing the recorded voice reply to said incoming E-mail message;
    e) generating an E-mail reply message comprising said voice data; and
    f) sending said E-mail reply message to the originator of said incoming E-mail message, as an E-mail reply message.

22. A method according to claim 21, wherein the voice data is generated by recording a voice message through the microphone of the telephone device.

23. A method according to claim 21, wherein the voice data is saved as a audio file which is attached to a reply e-mail message.

24. A method according to claim 21, wherein the e-mail message is displayed on the display of the telephone device.

25. A method according to claim 21, wherein the e-mail message is displayed on a display which is not associated with the telephone device.

26. A method according to claim 21, wherein the reply voice-message is associated with the incoming e-mail message to which it replies by a suitable association parameter.

27. Apparatus for replying to an incoming E-mail message with a corresponding voice message reply, comprising:
   a) presentation device for presenting the entire contents of said incoming E-mail message as text at a telephone of a recipient;
   b) indication device for indicating a desire to respond to said incoming E-mail message;
   c) calling device for initiating a call to the recipient's telephone to begin a recorded voice reply to said incoming E-mail message;
   d) voice-generating device for generating voice data containing the recorded voice reply to said incoming E-mail message; and
   e) replying device for sending said generated voice data to the originator of said incoming E-mail message, as an E-mail reply message.

28. Apparatus according to claim 27, further comprising attachment processor for attaching the incoming E-mail message to the generated voice data prior to sending said generated voice data.

29. Apparatus according to claim 27, wherein the presentation device comprises a display provided in, or coupled to, a telephone.

30. Apparatus according to claim 27, wherein the presentation device comprises an audio system provided in, or coupled to, a telephone.

31. Apparatus according to claim 30, in which the telephone is a cellular telephone.

32. Apparatus according to claim 30, in which the telephone is a smart-phone.

33. Apparatus according to claim 27, comprising:
   a) accession interface for accessing the mailbox of the recipient of the incoming E-mail message;
   b) display device for presenting a list of incoming E-mail messages, destined to said recipient;
   c) interface for selecting an incoming E-mail message from said list;
   d) device for presenting the contents of the selected incoming E-mail message to said recipient as text;
   e) recording device for recording a voice reply message originated by said recipient;
   f) voice-generation device for generating a voice reply data-file containing said voice reply message;
   g) message composing processor for composing a reply E-mail message from said voice reply data-file; and
   h) data link for sending said composed reply E-mail message to the originator of said incoming E-mail message.

34. A method according to claim 1, further comprising displaying a menu on a display of the recipient's telephone,
   wherein the recipient indicates the desire to respond to said incoming E-mail message through interaction with the menu.

35. A system according to claim 11, wherein a menu is displayed on said presentation apparatus and the recipient indicates the desire to respond to said incoming E-mail message through interaction with the menu.

36. A method according to claim 21, wherein the recipient indicates the desire to respond to said incoming E-mail message by using the recipient's telephone to interact with a menu displayed on a screen of the recipient's telephone.

37. An apparatus according to claim 27, wherein a menu is displayed on said presentation device and the recipient indicates the desire to respond to said incoming E-mail message through interaction with the menu.

* * * * *